(12) United States Patent
Shibata et al.

(10) Patent No.: US 10,876,274 B2
(45) Date of Patent: Dec. 29, 2020

(54) IDENTIFICATION SYSTEM FOR WORK MACHINE

(71) Applicant: Hitachi Construction Machinery Co., Ltd., Tokyo (JP)

(72) Inventors: Kouichi Shibata, Ibaraki (JP); Yuichiro Morita, Ibaraki (JP); Taiki Aizawa, Ibaraki (JP); Katsumasa Uji, Ibaraki (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 378 days.

(21) Appl. No.: 15/757,901

(22) PCT Filed: Jan. 27, 2017

(86) PCT No.: PCT/JP2017/003002
§ 371 (c)(1),
(2) Date: Mar. 6, 2018

(87) PCT Pub. No.: WO2017/141667
PCT Pub. Date: Aug. 24, 2017

(65) Prior Publication Data
US 2020/0224386 A1   Jul. 16, 2020

(30) Foreign Application Priority Data
Feb. 17, 2016   (JP) ................................. 2016-028414

(51) Int. Cl.
*E02F 9/20*   (2006.01)
(52) U.S. Cl.
CPC .......... *E02F 9/2058* (2013.01); *E02F 9/2004* (2013.01)
(58) Field of Classification Search
CPC ....... E02F 9/2058; E02F 9/2004; E02F 9/123; E02F 9/125; E02F 9/2075; E02F 9/20
See application file for complete search history.

(56) References Cited

U.S. PATENT DOCUMENTS 6,795,754 B2 * 9/2004 Sunami ..................... G06F 8/61
340/459
7,274,977 B2 * 9/2007 Frashure ................. H04L 12/12
701/2
(Continued)

FOREIGN PATENT DOCUMENTS

CN        103282256 A        9/2013
CN        103298642 A        9/2013
(Continued)

OTHER PUBLICATIONS

Japanese-language International Search Report (PCT/ISA/210) issued in PCT Application No. PCT/JP2017/003002 with English translation dated Feb. 28, 2017 (four (4) pages).
(Continued)

*Primary Examiner* — Michael J Zanelli
(74) *Attorney, Agent, or Firm* — Crowell & Moring LLP

(57) ABSTRACT

To provide an identification system for a work machine which is capable of preventing a setting error, the identification system for a work machine includes: a main control unit to control the entirety of a work machine; and a plurality of power control units to control components of the work machine. The main control unit acquires information about the entire vehicle body of the work machine. Each of the power control units acquires different information about a state of one of the components from that acquired by the other power control units, on the basis of a installation site of the power control unit installed on the work machine. In addition, the power control unit sets a function of the power control unit on the basis of the information about the state and the information about the entire vehicle body.

5 Claims, 6 Drawing Sheets

(56) References Cited

U.S. PATENT DOCUMENTS

| | | | | |
|---|---|---|---|---|
| 7,415,332 B2* | 8/2008 | Ito | ............................ | B60R 25/00 |
| | | | | 701/1 |
| 8,516,805 B2* | 8/2013 | Hagiwara | ............... | B01D 46/42 |
| | | | | 60/295 |
| 2004/0133327 A1 | 7/2004 | Ishimoto et al. | | |
| 2012/0130576 A1 | 5/2012 | Sugiyama et al. | | |
| 2013/0195595 A1 | 8/2013 | Hottmann et al. | | |
| 2013/0218390 A1 | 8/2013 | Morisaki | | |
| 2013/0253749 A1 | 9/2013 | Hayashi et al. | | |
| 2013/0289815 A1 | 10/2013 | Suzuki | | |
| 2015/0204048 A1 | 7/2015 | Colwell et al. | | |

FOREIGN PATENT DOCUMENTS

| | | | |
|---|---|---|---|
| CN | 103338971 A | 10/2013 | |
| EP | 2 573 281 A1 | 3/2013 | |
| JP | 6-173298 A | 6/1994 | |
| JP | 10-289009 A | 10/1998 | |
| JP | 2003-213730 A | 7/2003 | |
| JP | 2007-129823 A | 5/2007 | |
| JP | 2010-202135 A | 9/2010 | |
| JP | 2011-72171 A | 4/2011 | |
| JP | 2012-222527 A | 11/2012 | |

OTHER PUBLICATIONS

Japanese-language Written Opinion (PCT/ISA/237) issued in PCT Application No. PCT/JP2017/003002 dated Feb. 28, 2017 (three (3) pages).

\* cited by examiner

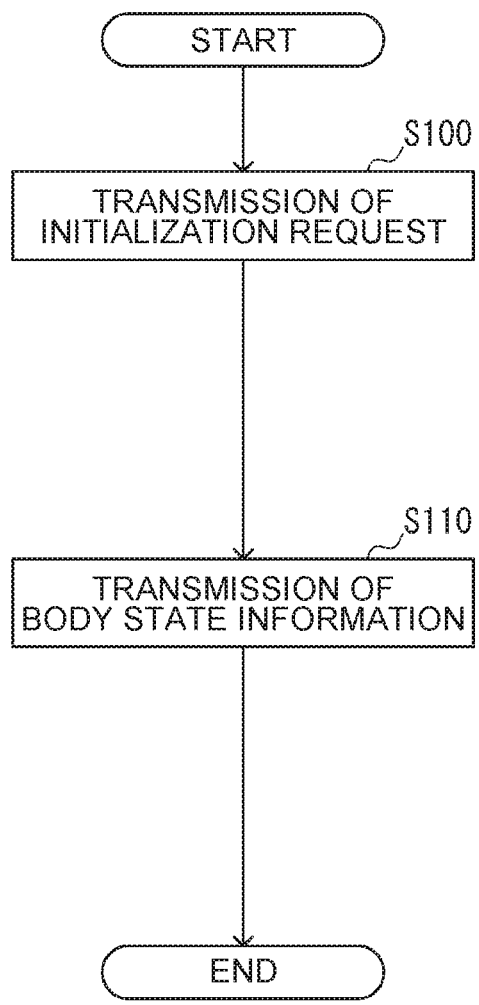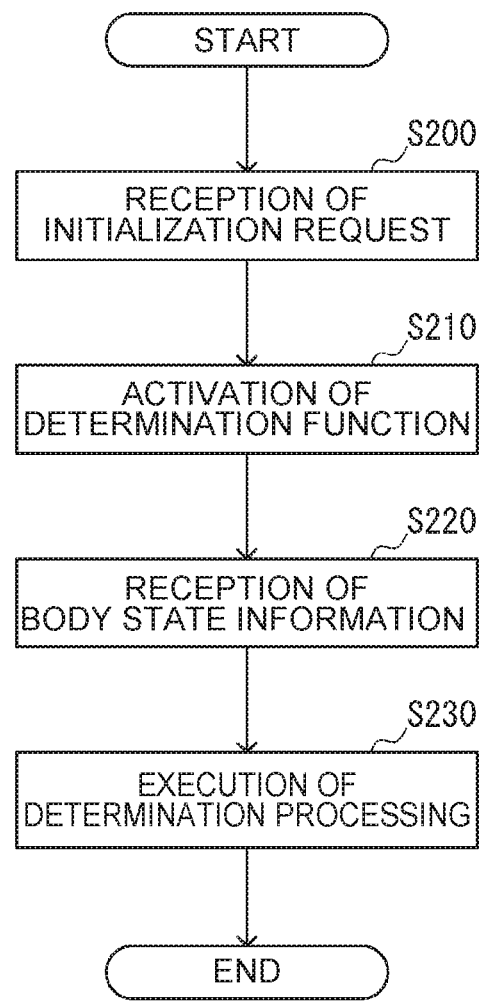

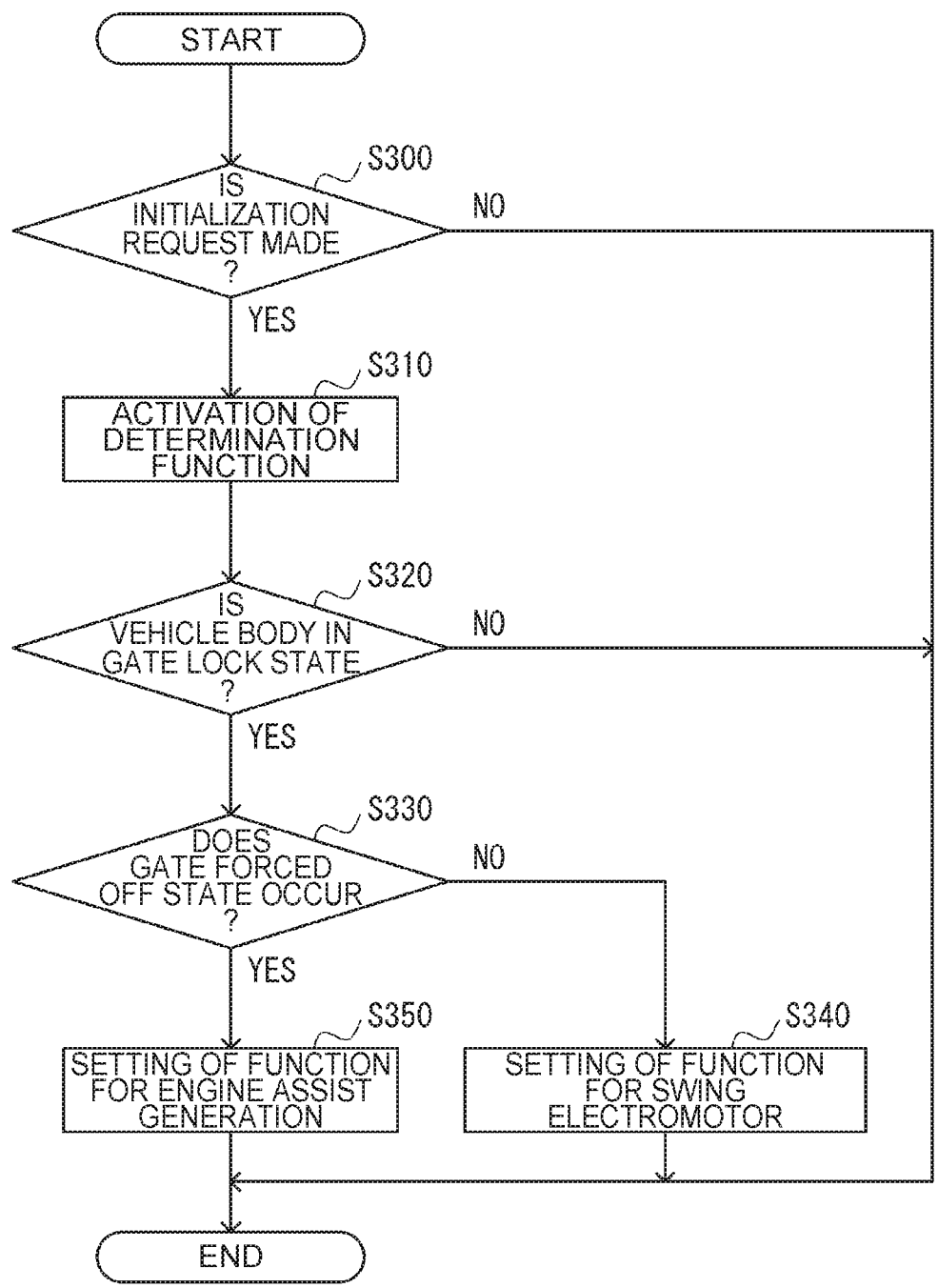

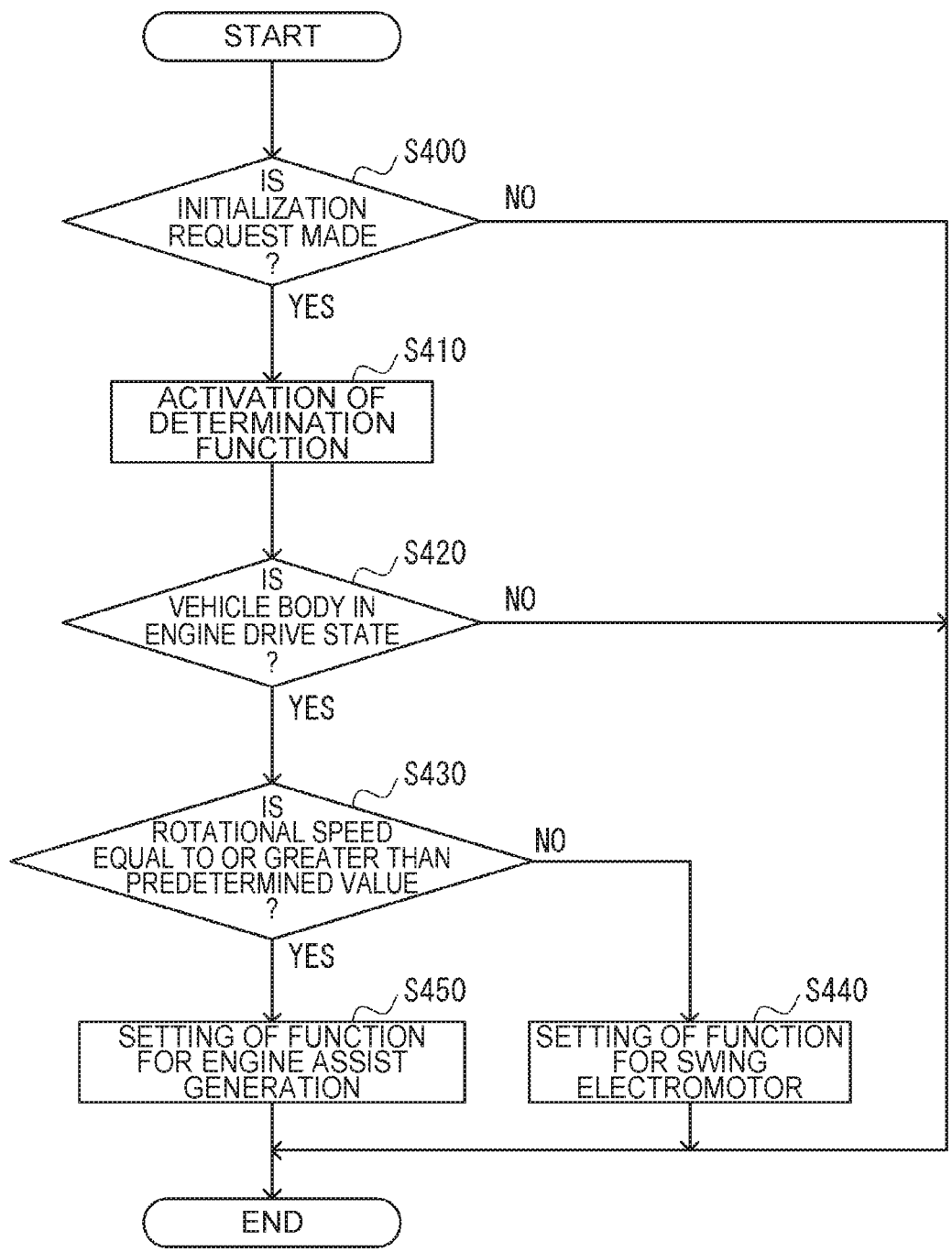

IDENTIFICATION SYSTEM FOR WORK MACHINE

TECHNICAL FIELD

The present invention relates to an identification system for a work machine.

BACKGROUND ART

An on-board network system is commonly known, which uses an ID (identifier) table possessed in common by a plurality of control units to assign a unique ID from the IDs registered on the ID table to each control unit (Patent Literature 1).

CITATION LIST

Patent Literature

PATENT LITERATURE 1: JP-A No. 2012-222527

SUMMARY OF INVENTION

Technical Problem

However, since the on-board network system described in Patent Literature 1 sets an ID that is randomly selected from the ID table, an ID setting error may occur.

Solution to Problem

An identification system for a work machine according to an aspect of the present invention includes: a first control device to control the entirety of a work machine; and a plurality of second control devices to control components of the work machine. In the identification system for the work machine, the first control device acquires information about the entire vehicle body of the work machine. Each of the second control devices acquires information about a state of one of the components on the basis of an installation site of the second control device installed on the work machine, the information about the state being different from that acquired by the other second control devices. In addition, the second control device sets a function of the second control device on the basis of the information about the state and the information about the entire vehicle body.

Advantageous Effects of Invention

According to the present invention, the function of a control unit is able to be set based on an installation site of the control unit installed on a work machine, enabling prevention of a setting error.

BRIEF DESCRIPTION OF DRAWINGS

FIG. 4(a) is a flowchart illustrating example processing in MCU 101, and FIG. 4(b) is a flowchart illustrating example processing in PCU 103.

FIG. 5 is a flowchart illustrating example determination processing in PCU 103 in accordance with the first embodiment.

FIG. 6 is a flowchart illustrating example determination processing in PCU 103 in accordance with a second embodiment.

DESCRIPTION OF EMBODIMENTS

First Embodiment

Figure 1:
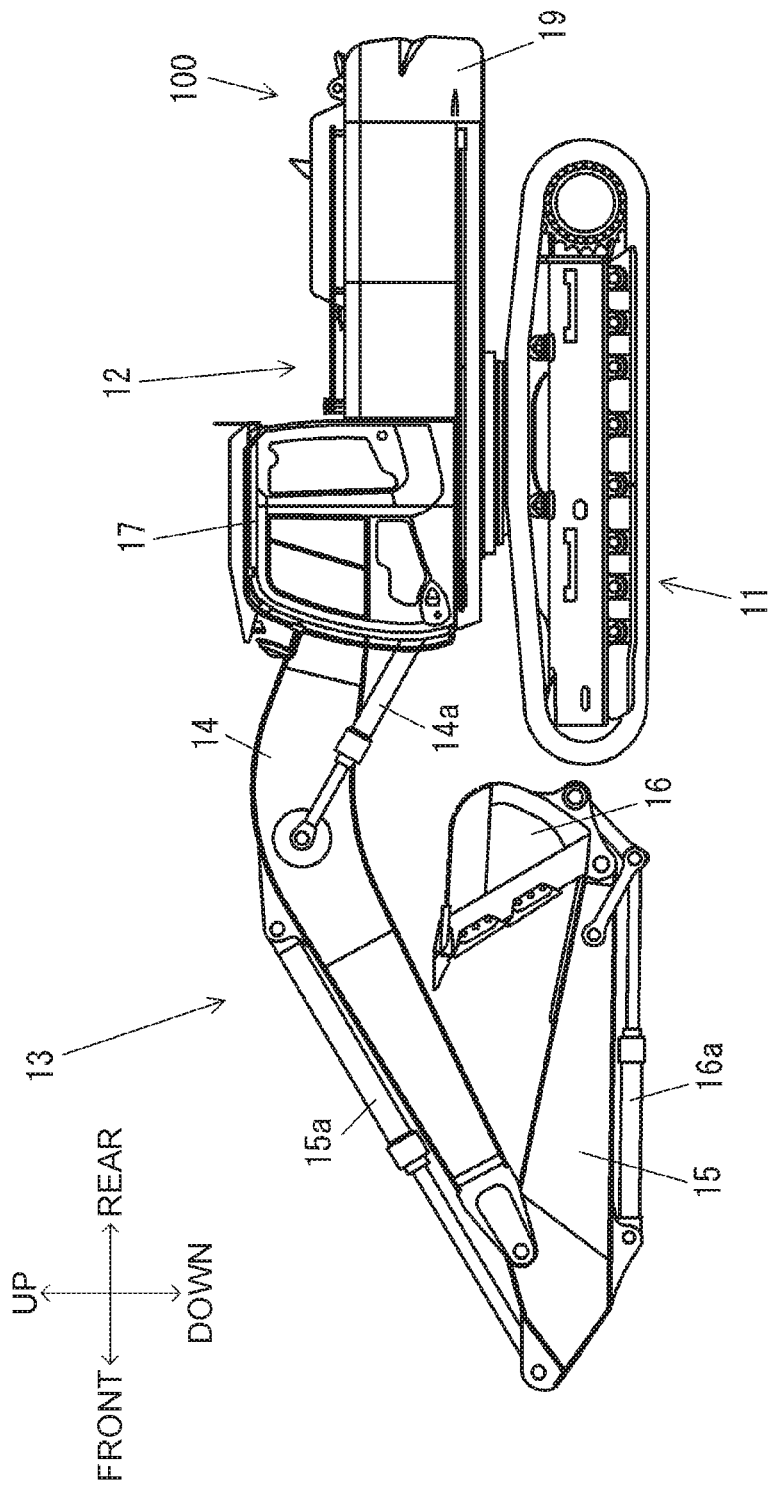
FIG. 1 is a side view of a hydraulic excavator 100 which is an example of work machines.

FIG. 1 is a side view of a hydraulic excavator 100 which is an example of work machines. Incidentally, for convenience in describing, front, rear, up and down directions with respect to the hydraulic excavator 100 are specified as shown in FIG. 1. The hydraulic excavator 100 includes a carriage 11 and a upperstructure 12 mounted on the carriage 11 in a revolvable manner. A front working device 13 is installed on the front portion of the upperstructure 12.

The front working device 13 includes a boom 14, an arm 15 and a bucket 16. The boom 14 is attached to the frame of the upperstructure 12 in a vertically rotatable manner relative to the upperstructure 12. The boom 14 is raised/lowered by being driven by a boom cylinder 14a.

The arm 15 is attached at the distal end of the boom 14 in a vertically rotatable manner relative to the boom 14. The arm 15 is raised/lowered by being driven by an arm cylinder 15a. The bucket 16 is attached at the distal end of the arm 15 in a vertical rotatable manner relative to the arm 15. The bucket 16 is driven by a bucket cylinder 16a.

The upperstructure 12 is equipped with a cab 17 for an operator aboard, and with a counterweight 19. An operating lever is installed in the cab 17. The operating lever is used to direct the driving of the front working device 13 and/or the upperstructure 12. The manipulated variable of the operating lever is detected by a pilot pressure sensor. The pilot pressure sensor then generates an operation signal corresponding to the manipulated variable of the operating lever.

Figure 2:
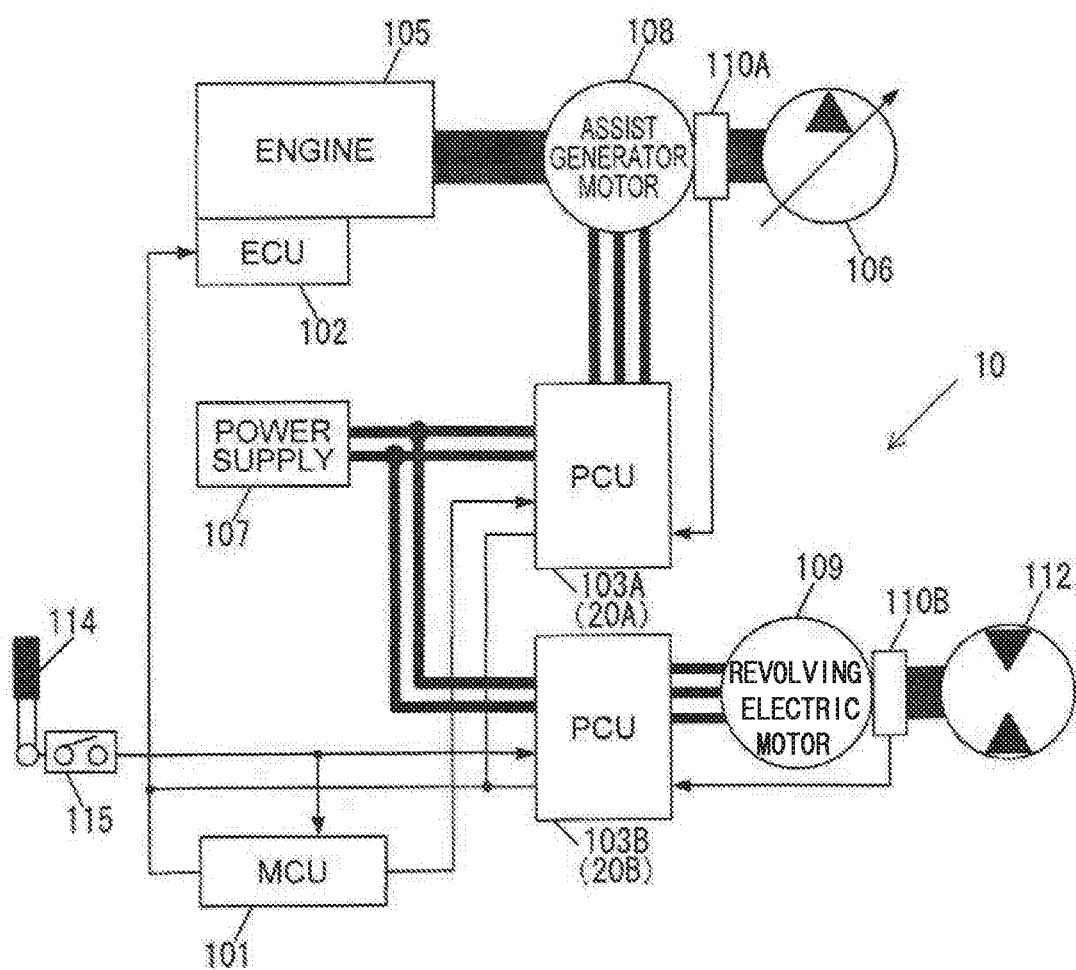
FIG. 2 is a block diagram illustrating an example configuration of the hydraulic excavator 100 to which an identification system in accordance with a first embodiment is applied.

FIG. 2 is a block diagram illustrating an example configuration of the hydraulic excavator 100 to which an identification system 10 in accordance with the first embodiment is applied. The hydraulic excavator 100 includes a main control unit (hereafter referred to as a "MCU 101"), an engine 105 which is an internal combustion engine, an engine control unit (hereinafter referred to as an "ECU 102") to control the engine 105, a hydraulic pump 106, a rotation sensor section 110A, an assist generator motor 108 to provide power assistance to the engine 105 and to generate electric power, a hydraulic motor used for revolving operation (hereinafter referred to as a "revolving hydraulic motor 112"), another rotation sensor section 110B, an electric motor used for revolving operation (hereinafter referred to as a "revolving electric motor 109"), a power supply 107, a gate-lock lever 114, and a gate-lock switch 115.

The hydraulic excavator 100 further includes two power control units (hereinafter referred to as "PCU(s) 103"), i.e., a power control unit for controlling the assist generator motor 108 (hereinafter referred to as a "PCU 103A") and a power control unit for controlling the revolving electric motor 109 (hereinafter referred to as a "PCU 103B"). The identification system 10 of the hydraulic excavator 100 includes the MCU 101, the PCU 103A and the PCU 103B.

The PCU 103A is installed in an installation site 20A and the PCU 103B is installed in an installation site 20B.

The MCU 101 is configured to include CPU, ROM and RAM which are storage devices, and a processing unit having other peripheral circuitry and/or the like. The MCU 101 controls the entire system of the hydraulic excavator 100. The MCU 101 is connected over a communication network to components such as ECU 102, PCU 103A, PCU 103B, the gate-lock switch 115 and the like. The MCU 101 makes data communication with each of the components of the hydraulic excavator 100 over the communication network. A communication scheme such as CAN (Controller Area Network) or the like can be used for the data communication. Each component of the hydraulic excavator 100 uses, for example, serial signals for data communication.

The MCU 101 generates control signals for the PCU 103A and the PCU 103B on the basis of the operation signal corresponding to the manipulated variable of the operating lever, and/or the like. The MCU 101 further acquires information about the entire vehicle body of the hydraulic excavator 100 on the basis of signals received from the individual components. The MCU 101 outputs the entire body information to the PCU 103A and the PCU 103B, the entire body information being the acquired information about the entire vehicle body. The MCU 101 generates and outputs a gate OFF control signal to the PCU 103A to control a switching element included in the PCU 103A as described later.

The ECU 102 has a RPM detector to detect RPM of the engine 105. The RPM detector generates a detection signal corresponding to a rotational speed of the engine 105. The ECU 102 outputs the detection signal acquired by the RPM detector, to the MCU 101.

The gate-lock lever 114 is selectively operated between a locked position in which instructions from the operating lever of the hydraulic excavator 100 are deactivated, and an unlocked position in which instructions from the operating lever are activated. The gate-lock switch 115 outputs a gate-lock lever state signal to the MCU 101 and the PCU 103B, the gate-lock lever state signal representing the operated position of the gate-lock lever 114.

The power supply 107 is configured to include, for example, a chargeable/dischargeable capacitor. The capacitor is charged or discharged depending on the driving states of the assist generator motor 108 and the revolving electric motor 109. It is noted that the power supply 107 may also be configured to include a secondary battery such as a lithium-ion battery or the like.

The assist generator motor 108 generates electric power by being rotationally driven by the engine 105. The assist generator motor 108 also produces rotational torque to assist the engine 105 and drives the hydraulic pump 106 in conjunction with the engine 105.

The rotation sensor section 110A has a rotation angle sensor such as a resolver or the like. The rotation sensor section 110A acquires a position signal corresponding to the magnetic pole position of the assist generator motor 108, and calculates a rotational speed of the assist generator motor 108 on the basis of the position signal. The rotation sensor section 110A outputs, to the PCU 103A, a motor state signal corresponding to the rotational speed of the assist generator motor 108.

The hydraulic pump 106 is driven by the engine 105 and the assist generator motor 108 to discharge pressure oil. The pressure oil discharged from the hydraulic pump 106 is supplied through a control valve to each of hydraulic actuators, such as the hydraulic cylinders (the boom cylinder 14a, the arm cylinder 15a, the bucket cylinder 16a) and/or the like. The drive shaft of the hydraulic pump 106 is placed coaxially with the drive shafts of the engine 105 and the assist generator motor 108.

The revolving electric motor 109 produces rotational torque to drive the upperstructure 12 in cooperation with the revolving hydraulic motor 112, and also generates electric power by being rotationally driven by the upperstructure 12. The revolving electric motor 109 generates electric power by, for example, regeneration during deceleration (during braking) of the upperstructure 12.

The rotation sensor section 110B has a rotation angle sensor such as a resolver or the like. The rotation sensor section 110B acquires a position signal corresponding to the magnetic pole position of the revolving electric motor 109, and calculates a rotational speed of the revolving electric motor 109 on the basis of the position signal. The rotation sensor section 110B outputs a motor state signal corresponding to the rotational speed of the revolving electric motor 109, to the PCU 103B.

The revolving hydraulic motor 112 drives the upperstructure 12 on the basis of the pressure oil discharged from the hydraulic pump 106 through a control valve. The drive shafts of the revolving hydraulic motor 112 and the revolving electric motor 109 are coaxially placed.

The PCU 103A controls the assist generator motor 108 on the basis of the control signal output from the MCU 101. The PCU 103B controls the revolving electric motor 109 on the basis of the control signal output from the MCU 101.

Figure 3:
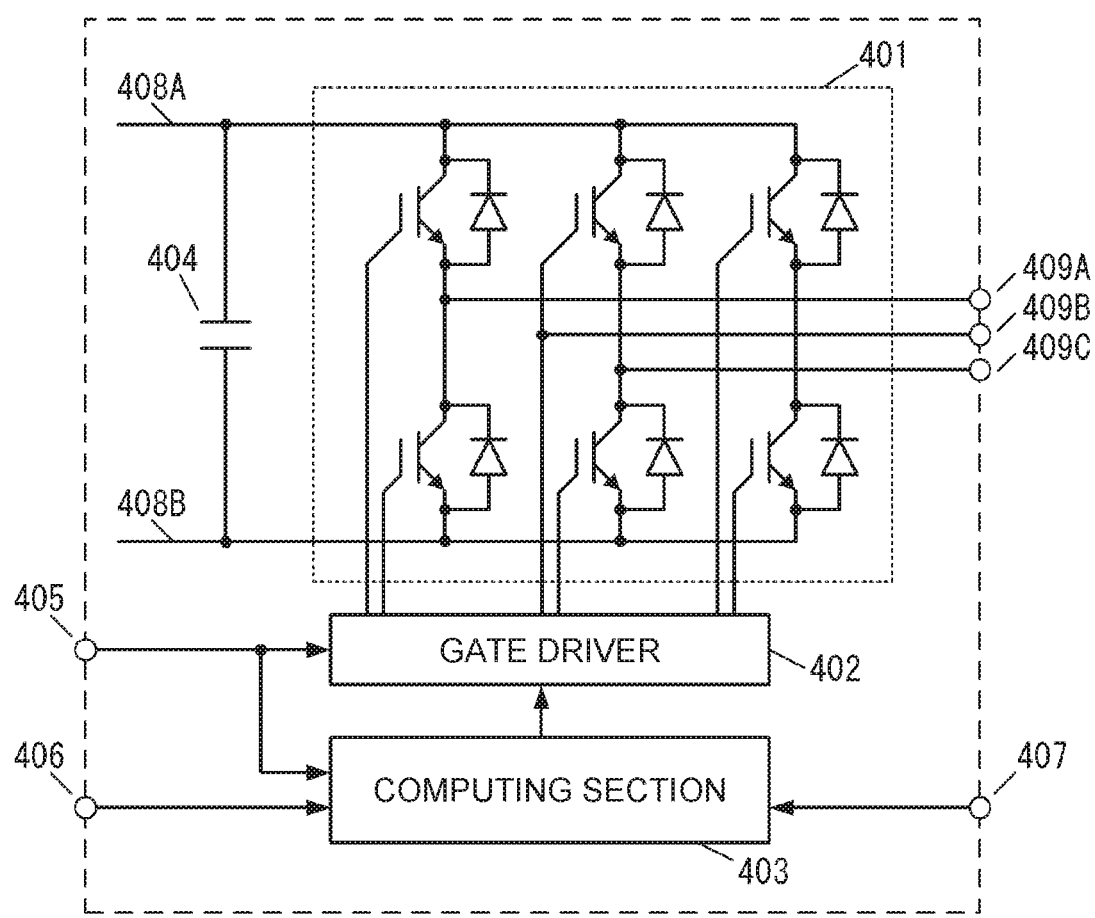
FIG. 3 is a block diagram illustrating an example configuration of a PCU 103 in accordance with the first embodiment.

FIG. 3 is a block diagram illustrating an example configuration of the PCU 103 in accordance with the first embodiment. Each of the PCU 103A and the PCU 103B has the configuration illustrated in FIG. 3.

The PCU 103B is configured to include an inverter 401, a gate driver 402, a computing section 403 and a capacitor 404. The PCU 103B is supplied with DC power from the power supply 107, and the PCU 103B convers the DC power into AC power and then outputs the AC power to the revolving electric motor 109, or otherwise the PCU 103B is supplied with AC power from the revolving electric motor 109, and the PCU 103B converts the AC power into DC power and then outputs the DC power to the power supply 107. A gate-lock lever state signal generated by the gate-lock switch 115 is input to the PCU 103B via a terminal 405, and the PCU 103B acquires the gate-lock lever state signal as a gate forced OFF signal either without any processing or after signal processing. The signal processing refers to processing for removing noise content from signal, by way of example.

The computing section 403 is configured to include CPU, ROM and RAM which are storage devices, and a processing unit having other peripheral circuitry and/or the like. The computing section 403 is connected via a terminal 406 to the MCU 101, ECU 102, PCU 103A, and makes data communication using ID for identification. The computing section 403 outputs a control signal to the gate driver 402 in response to an instruction from the MCU 101 in order to control the gate driver 402. The computing section 403 receives the gate forced OFF signal based on the gate-lock lever state signal, and also receives the motor state signal corresponding to the rotational speed of the revolving electric motor 109, from the rotation sensor 110B via a terminal 407. The gate driver 402 is configured to include a pre-driver circuit to drive a switching element of the inverter 401. Based on the control signal output from the computing section 403, the gate driver 402 generates a gate drive signal to control the switching element of the inverter 401. The gate driver 402 outputs the generated gate drive signal to the inverter 401. The gate driver 402 outputs, for example, a PWM signal as the gate drive signal for ON/OFF control on the switching element of the inverter 401. The gate driver 402 receives the gate forced OFF signal based on the gate-lock lever state signal.

The inverter 401 is configured to include a plurality of switching elements and diodes connected in parallel to the respective switching elements. Each of the switching elements is, for example, IGBT (Insulated Gate Bipolar Transistor). A bus 408A and a bus 408B are connected to the capacitor of the power supply 107 through a chopper and/or the like. The chopper is supplied with a DC voltage from the capacitor of the power supply 107, and increases and supplies the DC voltage to the bus 408A and the bus 408B, or otherwise the chopper is supplied with a DC voltage from the bus 408A and the bus 408B, and deceases and supplies the DC voltage to the capacitor of the power supply 107. The capacitor 404 for smoothing voltage is connected between the bus 408A and the bus 408B.

The inverter 401 is driven by the gate drive signal output by the gate driver 402. During motor driving by the revolving electric motor 109, the inverter 401 produces AC power from DC power of the bus 408A and the bus 408B, and the inverter 401 outputs the AC power to the revolving electric motor 109 via a terminal 409A, a terminal 409B and a terminal 409C. During electric power generation of the revolving electric motor 109, the inverter 401 converts AC power coming from the revolving electric motor 109, into DC power and outputs the DC power to the bus 408A and the bus 408B.

Where the gate forced OFF signal is enabled (e.g., where a signal voltage level is high), the gate driver 402 controls the inverter 401 to turn off the switching element so that power supply to the revolving electric motor 109 is interrupted. When the gate-lock lever 114 is in the locked position, the gate-lock switch 115 outputs a high level, gate-lock lever state signal in order to enable the gate forced OFF signal. Where the gate-lock lever 114 is operated to the locked position, the gate driver 402 forcedly interrupts the power supply to the revolving electric motor 109 in order to prevent malfunctions to occur in the upperstructure 12 due to misoperation of the operating lever and/or the like.

Similarly to the PCU 103B, the PCU 103A is configured to include an inverter 401, a gate driver 402, a computing section 403 and a capacitor 404. The PCU 103A is supplied with DC power from the power supply 107, and the PCU 103A converts the DC power into AC power and then outputs the AC power to the assist generator motor 108, or otherwise the PCU 103A is supplied with AC power from the assist generator motor 108, and the PCU 103A converts the AC power into DC power and then outputs the DC power to the power supply 107. The computing section 403 receives a motor state signal from the rotation sensor 110A via the terminal 407, the motor state signal corresponding to the rotational speed of the assist generator motor 108.

A gate OFF control signal generated by the MCU 101 is input to the PCU 103A via the terminal 405, and the PCU 103A acquires the gate OFF control signal as a gate forced OFF signal either without any processing or after signal processing. The gate forced OFF signal is then input to the gate driver 402 and the computing section 403. When the gate OFF control signal is high level, i.e., the gate forced OFF signal is enabled, the gate driver 402 controls the inverter 401 to turn off the switching element.

Two PCUs 103 with a common hardware configuration are used for the PCU 103A and the PCU 103B. The PCUs 103 are installed respectively in an installation site 20A dedicated to a PCU 103A and in an installation site 20B dedicated to a PCU 103B. The PCU 103 has a plurality of functions adapted to each of the installation site 20A and the installation site 20B.

Based on the installation site, the computing section 403 is connected to some components of the hydraulic excavator 100, the components being different from that to which the computing section 403 of the other PCU 103 is connected. Therefore, the computing section 403 in question acquires information about the states of the components of the hydraulic excavator 100, the information being different from that acquired by the other PCU 103. The corrupting section 403 determines the function of the PCU 103 on the basis of the acquired information about the component states of the hydraulic excavator 100, and of the information about the entire vehicle body of the hydraulic excavator 100 (the entire body information) acquired by the MCU 101. The computing section 403 has a program stored in ROM and/or the like for execution of processing adapted for each installation site. Based on the result of the determination, the computing section 403 executes the program stored in the ROM for setting of the function corresponding to the installation site.

The function set in the PCU 103 is, for example, a control function for output characteristics of the motor to be controlled, which contains a control program, a control parameter and/or the like. Making settings required to control the assist generator motor 108 causes the PCU 103 to act as the PCU 103A, and making setting required to control the revolving electric motor 109 causes the PCU 103 to act as the PCU 103B.

Based on the result of the function determination, the PCU 103 further makes the setting for a communication function. In the setting of the communication function, an ID corresponding to the installation site is defined in order to be assigned an ID which does not overlap with that of the other PCU 103. As an ID corresponding to the installation site, the PCU 103 defines an ID based on a communication priority order assigned to each of the PCU 103A and the PCU 103B, by way of example.

In the first embodiment, the MCU 101 acquires the entire body information of the hydraulic excavator 100 on the basis of the gate-lock lever state signal. The PCU 103 installed in the installation site 20B dedicated to a PCU 103B obtains the gate forced OFF signal based on the gate-lock lever state signal, as information about the constituent element state of the hydraulic excavator 100. The PCU 103 installed in the installation site 20A dedicated to a PCU 103A obtains the gate forced OFF signal based on the gate OFF control signal, as information about the constituent element state of the hydraulic excavator 100. The PCU 103 acts as the PCU 103B when it obtains the enabled, gate forced OFF signal during a gate lock state, and the PCU 103 acts as the PCU 103A when it obtains the disabled, gate forced OFF signal during the gate lock state.

FIG. 4(*a*) is a flowchart illustrating example processing in the MCU 101, and FIG. 4(*b*) is a flowchart illustrating example processing in the PCU 103. The processing illustrated in the flowchart of FIG. 4(*b*) is performed in each of the two PCUs 103. The processing illustrated in each flowchart of FIG. 4 is started by, for example, turning on an unillustrated key switch.

In step S100, the MCU 101 transmits an initialization request to two PCUs 103, the PCU 103 installed in the installation site 20A dedicated to a PCU 103A, and the PCU 103 installed in the installation site 20B dedicated to a PCU 103B, and then the MCU 101 proceeds to step S110.

In step S200, the PCU 103 receives the initialization request and proceeds to step S210. In step S210, the PCU 103 activates a determination function of determining the function of the PCU 103 on the basis of information about the component state and entire body information, and then the PCU 103 proceeds to step S220.

In step S110, the MCU 101 acquires information indicating the gate lock state, as entire body information of the hydraulic excavator 100 on the basis of a gate-lock lever state signal representative of the locked position. The MCU 101 transmits, to the two PCUs 103, the entire body information equivalent to the acquired result.

In step S220, the PCU 103 receives the entire body information and proceeds to step S230. In step S230, the PCU 103 acquires information about the component state of the hydraulic excavator 100. The PCU 103 determines, based on the information about the component state and on the entire body information, which function the PCU 103 should perform. The PCU 103 selects the function on the basis of the determination result, and the processing illustrated in FIG. 4 is terminated.

FIG. 5 is a flowchart illustrating example determination processing in the PCU 103 in accordance with the first embodiment. FIG. 5 is a diagram describing in detail the processing illustrated in FIG. 4(b). The processing illustrated in the flowchart of FIG. 5 is started at each of the two PCUs 103 by turning on an unillustrated key switch.

In step S300, the PCU 103 determines whether or not an initialization request is received from the MCU 101. If an affirmative determination is made in step S300, the process proceeds to step S310. If a negative determination is made in step S300, the processing shown in FIG. 5 is terminated.

In step S310, the PCU 103 activates the determination function of determining a function of the PCU 103 and proceeds to step S320.

In step S320, the PCU 103 determines, based on the entire body information received from the MCU 101, whether or not the hydraulic excavator 100 is in the gate lock state. If an affirmative determination is made in step S320, the process proceeds to step S330. If a negative determination is made in step S320, the processing shown in FIG. 5 is terminated In step S330, the PCU 103 determines, based on the gate forced OFF signal, whether or not a gate forced OFF state occurs. The PCU 103 installed in the installation site 20B dedicated to a PCU 103B acquires the gate forced OFF signal based on the gate-lock lever state signal, as information about the state of the hydraulic excavator 100. The PCU 103 installed in the installation site 20A dedicated to a PCU 103A acquires the gate forced OFF signal based on the gate OFF control signal, as information about the state of the hydraulic excavator 100.

When the hydraulic excavator 100 is in the gate lock state, i.e., when the operated position of the gate-lock lever 114 is the locked position, a high-level gate-lock lever state signal results. The PCU 103 installed in the installation site 20B dedicated to a PCU 103B acquires the enabled, gate forced OFF signal, so that the PCU 103 determines that the gate forced OFF state occurs and proceeds to step S350. In contrast with this, when the operated position of the gate-lock lever 114 is the locked position at the time of initialization of the PCU 103, the gate OFF control signal generated by the MCU 101 is set at a low level. The PCU 103 installed in the installation site 20A dedicated to a PCU 103A acquires the disenabled, gate forced OFF signal, so that the PCU 103 determines that no gate forced OFF state occurs and proceeds to step S340.

In step S340, the PCU 103 installed in the installation site 20A dedicated to a PCU 103A stores the settings of the PCU 103A to control the assist generator motor 108 and terminates the processing shown in FIG. 5. In step S350, the PCU 103 installed in the installation site 20B dedicated to a PCU 103B stores the settings of the PCU 103B to control the revolving electric motor 109 and terminates the processing shown in FIG. 5.

The following is an overview of the operation in the embodiment. In a manufacturing plant or a maintenance factory, the two PCUs 103 are installed on the hydraulic excavator 100. Upon an operator turning on a key switch, the hydraulic excavator 100 is started up. The operator operates a service tool to make a request of the MCU 101 to start setting. The MCU 101 transmits an initialization request to each of the two PCUs 103. When the gate-lock lever 114 is in the locked position, the MCU 101 acquires information about a gate lock state of the hydraulic excavator 100 and transmits it to each of the two PCUs 103.

Upon reception of the initialization request from the MCU 101, each PCU 103 activates a determination function of determining a function of the PCU 103. Upon reception of the information indicating the gate lock state from the MCU 101, the PCU 103 determines based on the gate forced OFF signal which function the PCU 103 should perform.

Where the gate forced OFF signal is enabled, the PCU 103 stores the settings for the PCU 103B, whereas where the gate forced OFF signal is disabled, the PCU 103 stores the setting for the PCU 103A.

According to the above embodiment, the following operation and effects can be provided.

(1) The identification system 10 of the hydraulic excavator 100 includes the MCU 101 (the first control device) to control the entirety of the hydraulic excavator 100, and a plurality of the PCUs 103 (the second control devices) to control the components of the hydraulic excavator 100. The MCU 101 acquires information about the entire vehicle body of the hydraulic excavator 100. Based on an installation site of each PCU 103 installed on the hydraulic excavator 100, the PCU 103 acquires different information about the component state from that acquired by the other PCUs 103, and the PCU 103 determines a function of the PCU 103 on the basis of the state information and the information about the entire vehicle body. In the embodiment, the function to be performed by the PCU 103 is determined based on the installation site of the hydraulic excavator 100, and the function in agreement with the determination result is set. Setting a function corresponding to the installation site enables prevention of a setting error.

(2) The PCU 103 has a plurality of functions adapted to both the installation site 20A and the installation site 20B, and selects the function corresponding to the installation site 20A or the installation site 20B on the basis of the determination result. By such configuration, a function corresponding to an installation site is able to be set after the installation on the hydraulic excavator 100.

(3) If the PCU 103 has only one function, it is impossible to make a function selection after installation on the hydraulic excavator 100. Because of this, when using the two PCUs 103 with a common hardware configuration, incorrect assembly may occur. However, in the embodiment, the PCU 103 has the function of controlling the assist generator motor and also the function of controlling the revolving electric motor, and the PCU 103 is set such as to perform the function corresponding to the installation site determined after it is installed on the hydraulic excavator 100. Because of this, incorrect assembly may be prevented. As a result, a reduction in parts inventory for maintenance management is achieved.

(4) Based on the installation site of each PCU 103 installed on the hydraulic excavator 100, the PCU 103 is connected to components different from that to which the other PCU 103 is connected, so that the PCU 103 obtains state information different from that obtained by the other PCU 103. In the embodiment, the PCU 103 installed in the installation site 20B dedicated to the PCU 103B obtains a gate forced OFF signal based on a gate-lock lever state signal, as the information about the state of the hydraulic excavator 100. The PCU 103 installed in the installation site 20A dedicated to the PCU 103A obtains a gate forced OFF signal based on a gate OFF control signal, as the information about the state of the hydraulic excavator 100. By such configuration, it is possible to determine a function adapted to an installation site for each of a plurality of PCUs 103.

(5) In a conceivable method for setting the function of the PCU 103 after installation on the hydraulic excavator 100, a mechanical switch may be provided and the function of each PCU 103 may be set by on/off of the switch. In contrast to this, in the embodiment, an existing terminal and a signal line are used to set the function of the PCU 103, so that there is no need for any hardware modification such as an addition of a mechanical switch and/or the like.

(6) In the first embodiment, the information about the state of the hydraulic excavator 100, which is obtained by the PCU 103, is the information about the operated positions of the gate-lock lever 114 operated between the locked position in which instructions from the operating lever of the hydraulic excavator 100 are deactivated, and an unlocked position in which instructions from the operating lever are activated. The information about the entire vehicle body, which is obtained by the MCU 101, indicates the gate lock state in which the gate-lock lever 114 is operated to the locked position. By such configuration, a function of the PCU 103 is able to be set based on the information about the operated position of the gate-lock lever.

Second Embodiment

A hydraulic excavator 100 and a PCU 103 in accordance with a second embodiment have configurations similar to those of the hydraulic excavator 100 and the PCU 103 in accordance with the first embodiment (see FIG. 2, FIG. 3). In the example described in the first embodiment, the MCU 101 acquires the entire body information of the hydraulic excavator 100 on the basis of the gate-lock lever state signal, and the PCU 103 uses the signal indicating an operated position of the gate-lock lever 114 as the information about the component state of the hydraulic excavator 100. In contrast to this, in the second embodiment, the MCU 101 acquires the entire body information of the hydraulic excavator 100 on the basis of a detection signal corresponding to a rotational speed of the engine 105, and the PCU 103 uses signals indicating rotational speeds of the assist generator motor 108 and the revolving electric motor 109 as the information about the component state of the hydraulic excavator 100.

Based on a detection signal generated corresponding to the rotational speed of the engine 105 by the ECU 102, the MCU 101 acquires the information indicating the engine drive state, as the entire body information of the hydraulic excavator 100. The MCU 101 determines the engine drive state, for example, when the rotational speed of the engine 105 is equal to or greater than a predetermined value (e.g., 200 rpm). The MCU 101 transmits, to the two PCUs 103, the entire body information equivalent to the determination result. If the PCU 103 acquires a motor state signal indicating a motor rotational speed equal to or greater than a predetermined value during the engine drive state, the PCU 103 acts as the PCU 103A. If the PCU 103 acquires a motor state signal indicating a motor rotational speed not exceeding a predetermined value during the engine drive state, the PCU 103 acts as the PCU 103B.

FIG. 6 is a flowchart illustrating example determination processing in the PCU 103 in accordance with the second embodiment. The processing illustrated in the flowchart of FIG. 6 is started in each of the two PCUs 103 by, for example, turning on an unillustrated key switch.

In step S400, the PCU 103 determines whether or not an initialization request is received from the MCU 101. If an affirmative determination is made in step S400, the process proceeds to step S410. If a negative determination is made in step S400, the processing shown in FIG. 6 is terminated.

In step S410, the PCU 103 activates a determination function of determining a function of the PCU 103 and proceeds to step S420.

In step S420, the PCU 103 determines based on the entire body information input from the MCU 101 whether or not the hydraulic excavator 100 is in the engine drive state. If an affirmative determination is made in step S420, the process proceeds to step S430. If a negative determination is made in step S420, the processing shown in FIG. 6 is terminated.

In step S430, the PCU 103 installed in the installation site 20A dedicated to a PCU 103A determines based on the motor state signal corresponding to the rotational speed of the assist generator motor 108 whether or not the motor rotational speed is equal to or greater than a predetermined value. The PCU 103 installed in the installation site 20B dedicated to a PCU 103B determines based on the motor state signal corresponding to the rotational speed of the revolving electric motor 109 whether or not the motor rotational speed is equal to or greater than a predetermined value. The predetermined value used in the determination is a threshold for determining whether or not the motor is in the stop state, which is set to, for example, 200 rpm.

When the hydraulic excavator 100 is in the engine drive state, the assist generator motor 108 is in the drive state. The PCU 103 installed in the installation site 20A dedicated to the PCU 103A determines that the motor rotational speed is equal to or greater than the predetermined value, and proceeds to step S450. However, in the initialization setting for the PCU 103, the revolving electric motor 109 is determined to be in the stop state. The PCU 103 installed in the installation site 20B dedicated to the PCU 103B determines that the motor rotational speed is not equal to or greater than the predetermined value, and proceeds to step S440.

In step S440, the PCU 103 installed in the installation site 20B dedicated to the PCU 103B stores setting for the PCU 103B to control the revolving electric motor 109, and the processing illustrated in FIG. 6 is terminated. In step S450, the PCU 103 installed in the installation site 20A dedicated to the PCU 103A stores setting for the PCU 103A to control the assist generator motor 108, and the processing illustrated in FIG. 6 is terminated.

According to the above embodiment, the following operation and effects can be provided in addition to the same operation and effects as (1) to (5) described in the first embodiment.

(7) In the second embodiment, the information about the state of the hydraulic excavator 100, which is obtained by each of the PCU 103A and the PCU 103B, is the information about the motor rotational speed of the hydraulic excavator 100. The information about the entire vehicle body obtained by the MCU 101 represents the engine drive state in which the rotational speed of the engine 105 is equal to or greater than a predetermined value. By such configuration, the function of the PCU 103 is able to be determined based on the rotational speeds of the assist generator motor 108 and the revolving electric motor 109 during the engine drive state.

Modifications as described below are within the scope of the present invention, and one or multiple modification may be combined with the above embodiment(s).

Example Modification 1

In the example described in the above first embodiment, a signal about the operated position of the gate-lock lever is used to determine the function of the PCU 103. However, the function of the PCU 103 may also be determined by use of a signal about an operated position of any other operating lever operated for stopping the operation of a part of the vehicle body. For example, a signal about an operated position of a stop lever for stopping the engine 105 or the upperstructure 12 may be used in the present invention.

Example Modification 2

In the examples described in the above embodiments, the function of one each of the two PCUs 103 is determined. However, the function of only one of the two PCUs 103 may be determined, and a function of the other PCU 103 may be determined based on the determination result of the function of the one PCU 103.

Example Modification 3

In the examples described in the above embodiments, the hydraulic excavator 100 is used as an example of work machines. However, the present invention is not limited to the embodiments, and the present invention is applicable to other work machines such as, e.g., a wheel loader, a forklift, a telehandler, a lift truck, a dump truck, a crane truck, and the like.

Although various embodiments and example modifications have been illustrated and described, the present invention is not limited to the details of those embodiments and example modifications. Other aspects contemplated within the scope of technical sprit of the present invention will fall within the scope and sprint of the present invention.

REFERENCE SIGNS LIST

10 . . . Identification system
20A . . . Installation site
20B . . . Installation site
101 . . . MCU (First control unit)
103 . . . PCU (Second control unit)
105 . . . Engine
108 . . . Assist generator motor (motor)
109 . . . Revolving electric motor (motor)
114 . . . Gate-lock lever
100 . . . Hydraulic excavator (work machine)

The invention claimed is:

1. A work machine, comprising: a main control unit to control the entirety of a work machine; and a plurality of power control units to control components of the work machine,
wherein
the main control unit is connected to each of power control units respectively via a controller area network, comprises a CPU, and is configured to acquire information about the entire vehicle body of the work machine, and
each of the power control units is configured to
acquire information about a state of one of the components on the basis of an installation site of a respective one of the power control units installed on the work machine, the information about the state being different from that acquired by the other power control units, and
set a function of the respective one of the power control units on the basis of the information about the state and the information about the entire vehicle body.

2. The work machine according to claim 1, wherein each of the power control units has a plurality of functions corresponding to the respective installation sites, and the each of the power control units sets a function corresponding to the respective installation site.

3. The work machine according to claim 1, wherein based on the respective installation site of each of the power control units installed on the work machine, the respective one of the power control units is connected to the component different from others of the components to which others of the power control units are connected, in order to acquire the information about the state which is different from states acquired by the others of the power control units.

4. The work machine according to claim 1, wherein the information about the state includes information about an operated position of a gate-lock lever that is operated between a locked position in which instructions from an operating lever of the work machine are deactivated, and an unlocked position in which instructions from the operating lever are activated, and the information about the entire vehicle body indicates a gate lock state in which the gate-lock lever is operated to the locked position.

5. The work machine according to claim 1, wherein the information about the state is information about a rotational speed of a motor of the work machine, and the information about the entire vehicle body indicates an engine drive state in which a rotational speed of the engine of the work machine is equal to or greater than a predetermined value.

* * * * *